United States Patent [19]

Okusaka et al.

[11] Patent Number: 5,338,920
[45] Date of Patent: Aug. 16, 1994

[54] METHOD OF MANUFACTURING AND JOINING ELECTRO-FUSION FITTING

[75] Inventors: Shigeru Okusaka; Hideki Kasa; Masayuki Sakaguchi; Junsuke Kyomen; Takashi Tago, all of Osaka, Japan

[73] Assignees: Metcal, Inc., Menlo Park, Calif.; Kubota Corporation, Japan

[21] Appl. No.: 915,849

[22] PCT Filed: Nov. 29, 1991

[86] PCT No.: PCT/JP91/01647
§ 371 Date: Aug. 28, 1992
§ 102(e) Date: Aug. 28, 1992

[87] PCT Pub. No.: WO92/09842
PCT Pub. Date: Nov. 6, 1992

[30] Foreign Application Priority Data

Nov. 30, 1990 [JP] Japan .................. 2-339048

[51] Int. Cl.⁵ .................. H05B 6/10; F16L 47/02
[52] U.S. Cl. .................. 219/633; 219/611; 219/643; 285/21; 156/274.2
[58] Field of Search .......... 219/8.5, 9.5, 10.41, 219/10.43, 10.53, 10.75, 85.11, 10.57, 607, 611, 616, 633, 643; 156/272.4, 274.2, 296; 264/26, 27, 25; 285/21

[56] References Cited

U.S. PATENT DOCUMENTS

| | | | |
|---|---|---|---|
| 2,448,690 | 9/1948 | Storm | 219/10.57 |
| 3,603,759 | 9/1971 | Peacock | 219/9.5 |
| 4,300,031 | 11/1981 | Reboux et al. | 219/9.5 |
| 4,438,310 | 3/1984 | Cachat | 219/10.43 |
| 4,914,267 | 4/1990 | Derbyshire | 219/85.1 |
| 5,036,210 | 7/1991 | Goodman | 264/105 |
| 5,125,690 | 6/1992 | Taylor et al. | 285/21 |

FOREIGN PATENT DOCUMENTS 63-272535 11/1988 Japan .
WO80/02124 10/1980 PCT Int'l Appl. .

Primary Examiner—Philip H. Leung
Attorney, Agent, or Firm—Howard L. Rose

[57] ABSTRACT

An electro-fusion fitting includes a body, and a magnetic alloy member which is continuous in the axial direction is embedded in the vicinity of a joint surface of the body. A shield member is arranged on the outer surface of the body in a portion where a cold zone is to be formed. The joint surface of the body and a joint surface of a member to be joined are brought into contact with each other. When a high frequency current is applied to the magnetic alloy member from a high frequency power supply by electromagnetic induction in this state, the magnetic alloy member generates heat, so that the body and the member to be joined are fused, and joined to each other. Since the shield member shields the electromagnetic induction, the magnetic alloy member in a portion where the shield member is provided does not generate heat, so that the cold zone is formed in the portion.

8 Claims, 11 Drawing Sheets

F I G. 1
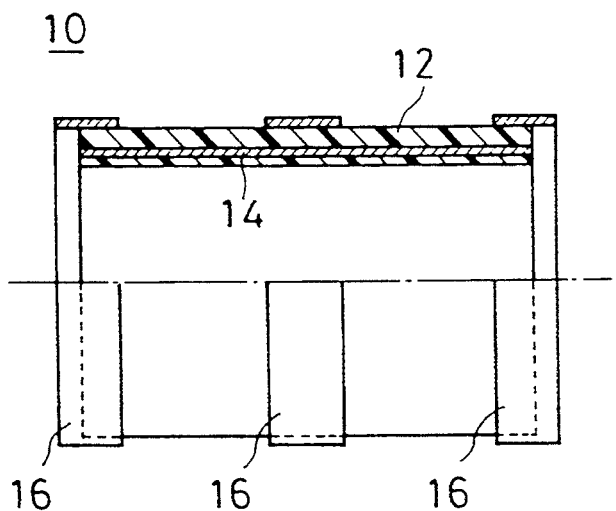
F I G. 2
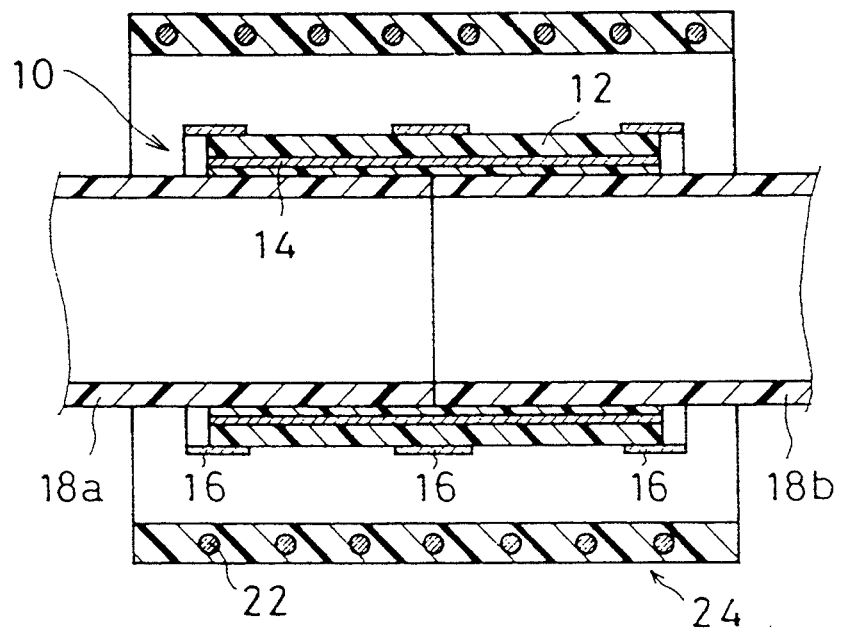

F I G. 6
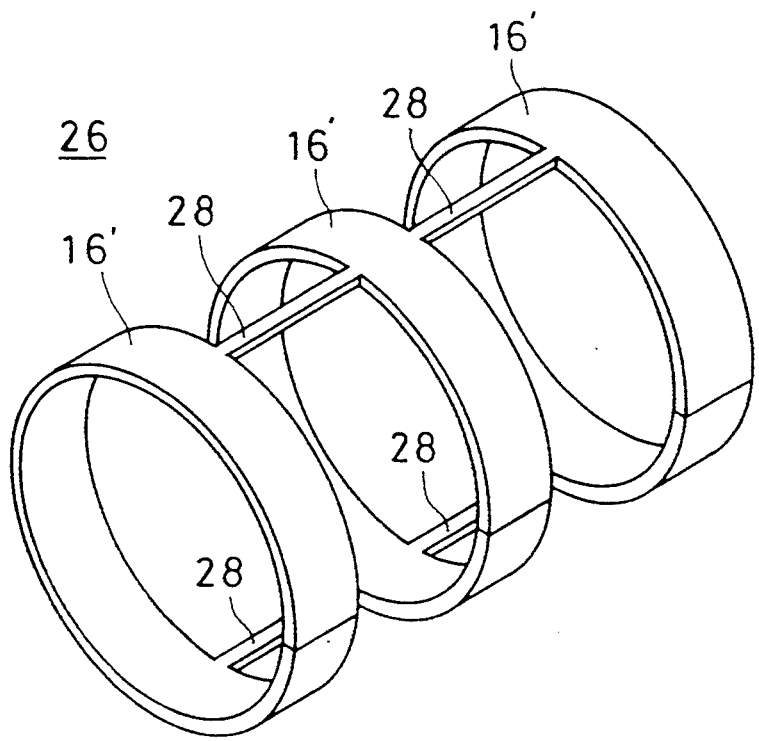
F I G. 7
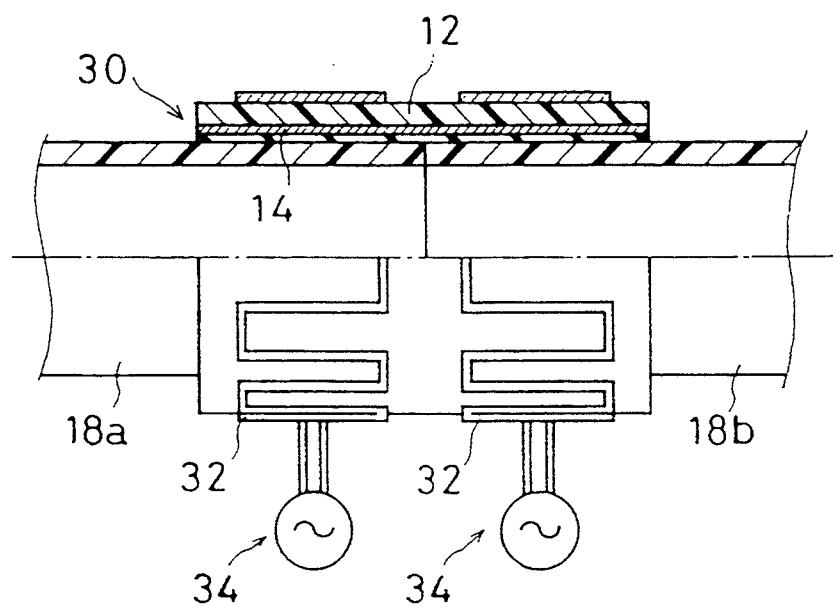

F I G. 12
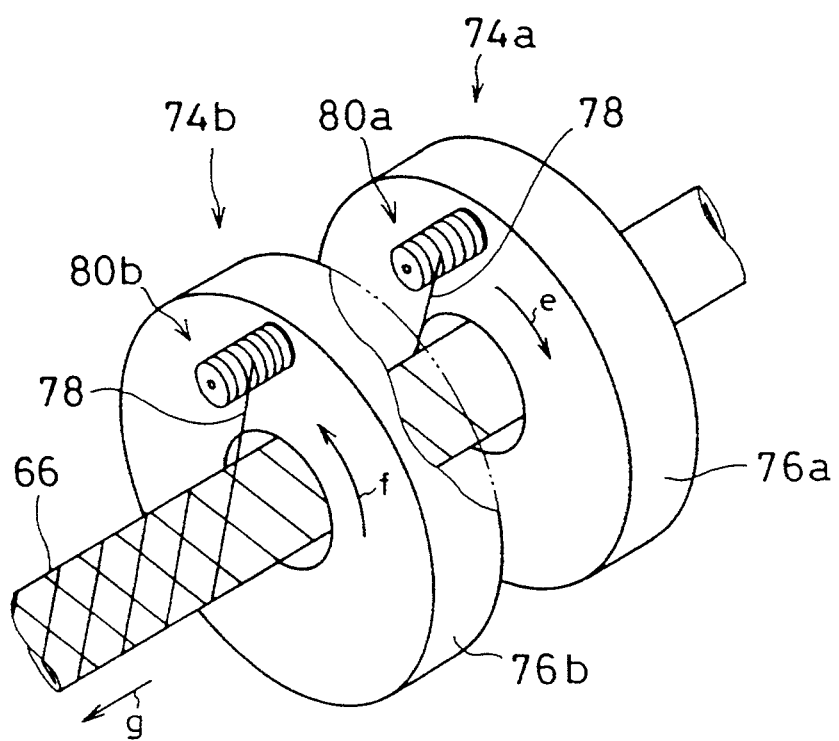

METHOD OF MANUFACTURING AND JOINING ELECTRO-FUSION FITTING

TECHNICAL FIELD

The present invention relates to an electro-fusion fitting. More particularly, it relates to an electro-fusion fitting used for joining a synthetic resin pipe or the like, and a joining method using the electro-fusion fitting and a method of manufacturing the electro-fusion fitting.

PRIOR ART

The applicant of the present invention has proposed in Japanese Utility Model Laying-open No. 86847/1990 an electro-fusion fitting which is used for joining a pipe made of a synthetic resin material such as polyethylene, polybutene and etc. and is the background of the present invention.

An electro-fusion fitting 1 shown in FIG. 17 which is the background of the present invention includes a hollow cylindrical body 2 made of a synthetic resin material, and a cylindrical magnetic alloy member is embedded in the vicinity of the inner surface of the body 2 excluding a cold zone 6. Resin pipes 4 are inserted from both ends of the body 2. A high frequency current is applied to the magnetic alloy member 3 by a high frequency power supply 5, so that the magnetic alloy member 3 generates heat. Consequently, joint surfaces of the body 2 and the resin pipe 4 are fused, so that the body 2 and the resin pipe 4 are joined to each other.

Such an electro-fusion fitting 1 has the disadvantages of being inferior in productivity and high in manufacturing costs because it is manufactured by injection molding due to the necessity of forming the cold zone 6.

On the other hand, if the body 2 is formed by extrusion molding, it is possible to improve the productivity. However, the cold zone 6 cannot be formed by the extrusion molding because the magnetic alloy member 3 is continuous.

Meanwhile, the cold zone means a region where the body 2 is not fused. If such the cold zone 6 is not formed, the body 2 in a portion where no cold zone is formed is fused at the time of fusing, and molten resin flows out of a gap between the body 2 and the pipe 4 consequently, pressure for fusing and joining both the body 2 and the pipe 4 is reduced, so that joint defects occur. The cold zone 6 is required to prevent such joint defects.

SUMMARY OF THE INVENTION

Therefore, a principal object of the present invention is to provide a new electro-fusion fitting, and a joining method using the electro-fusion fitting and a method of manufacturing the electro-fusion fitting.

Another object of the present invention is to provide an electro-fusion fitting in which a cold zone can be formed at the time of fusing even if a magnetic alloy member embedded in the electro-fusion fitting is continuous and a joining method using the electro-fusion fitting.

Still another object of the present invention is to provide a method of manufacturing an electro-fusion fitting, in which it is possible to simply manufacture an electro-fusion fitting in which a cold zone can be formed.

An electro-fusion fitting according to the present invention is an electro-fusion fitting to which a member to be jointed made of a first synthetic resin material and having a first joint surface is joined, which comprises: a body made of a second synthetic resin material and having a second joint surface along the first joint surface of the member to be jointed, the first and second synthetic resin materials respectively having first and second fusion temperatures; a magnetic alloy member so formed as to be continuous in the axial direction on the inner surface of the body or the vicinity thereof, the magnetic alloy member having a curie temperature equal to or higher than the first and second fusion temperatures; and a shield member provided on the outer surface of a portion, where a cold zone is to be formed, of the body and for shielding electromagnetic induction from a high frequency power supply to the magnetic alloy member.

The body and the member to be joined are so fixed to each other that the second joint surface of the body is along the first joint surface of the member to be joined. If current is applied from the high frequency power supply to the magnetic alloy member by the electromagnetic induction in that state, the magnetic alloy member generates heat, so that the temperature of the magnetic alloy member is raised. If the temperature of the magnetic alloy member reaches the Curie temperature, the permeability of the magnetic alloy member is rapidly decreased. At this time, little current flows, so that the temperature of the magnetic alloy member is not further raised. If the temperature of the magnetic alloy member is lowered by thermal radiation, the permeability of the magnetic alloy member is increased, so that current flows therein again. Since such an operation is repeated, the temperature of the magnetic alloy member is substantially kept at a predetermined Curie temperature. Consequently, a junction of the body and the member to be joined is heated at the Curie temperature of the magnetic alloy member or the vicinity thereof, to be fused. At this time, the shield member shields the electromagnetic induction from the high frequency power supply. Accordingly, the magnetic alloy member which exists in a portion where the shield member is provided does not generate heat, so that a cold zone is formed in the portion.

The present invention provides a method of joining an electro-fusion fitting and a member to be joined made of a first synthetic resin material and having a first joint surface to each other, which comprises the steps of: (a) preparing an electro-fusion fitting including a body made of a second synthetic resin material and having a second joint surface along the first joint surface of the member to be joined and a magnetic alloy member so formed as to be continuous in the axial direction on the second joint surface of the body or the vicinity thereof, the first and second synthetic resin materials respectively having first and second fusion temperatures, the magnetic alloy member having a Curie temperature equal to or higher than the first and second fusion temperatures; (b) fixing the member to be joined and the electro-fusion fitting to each other in a state where the first joint surface and the second joint surface are in contact with each other; and (c) applying high frequency current to the magnetic alloy member in a portion other than a portion where a cold zone is to be formed by electromagnetic induction.

Both the body and the member to be joined are so fixed to each other that the second joint surface of the body is along the first joint surface of the member to be joined. An induction coil in the high frequency power supply is partially arranged on the outer surface, for example, of the electro-fusion fitting. If current is applied to the magnetic alloy member from the high frequency power supply by the electromagnetic induction, the magnetic alloy member generates heat, so that the body and the member to be joined are fused and joined to each other. At this time, the magnetic alloy member in a portion where no current is induced from the high frequency power supply does not generate heat, so that a cold zone is formed in the portion.

According to the present invention, even if the magnetic alloy member embedded in the electro-fusion fitting is so formed as to be continuous in the axial direction, a cold zone can be formed at the time of fusing. Consequently, the body including the magnetic alloy member on its inner surface or the vicinity thereof can be continuously formed by extrusion molding, thereby to make it possible to improve the productivity and therefore, to reduce the manufacturing costs. Meanwhile, the first synthetic resin material and the second synthetic resin material may be the same or different from each other. Similarly, the first fusion temperature and the second fusion temperature may be the same or different from each other.

The present invention provides a method of manufacturing an electro-fusion fitting to which a member to be joined made of a first synthetic resin material and having a first joint surface is joined, comprising the steps of: (a) continuously forming a pipe by extrusion molding using a second synthetic resin material, the first and second synthetic resin materials respectively having first and second fusion temperatures; (b) continuously winding a magnetic alloy wire made of a magnetic alloy around the outer surface of the pipe, the magnetic alloy wire having a Curie temperature equal to or higher than the first and second fusion temperatures, the magnetic alloy wire including a first portion where the winding density is relatively high and a second portion where it is relatively low; (c) obtaining a pipe-shaped molded body by continuously forming a resin layer on the outer surface of the pipe so as to cover the magnetic alloy wire; and (d) cutting the pipe-shaped molded body in a predetermined point in the axial direction.

The magnetic alloy wire is wound around the outer surface of the pipe continuously formed in the longitudinal direction by the extrusion molding. The second portion where the winding density is low in the magnetic alloy wire forms a cold zone. Consequently, in the manufacturing method according to the present invention, it is possible to simply manufacture an electro-fusion fitting having a cold zone by only adjusting the winding density of the magnetic alloy wire wound around the outer periphery of the pipe.

The manufacturing method according to the present invention may be so modified as to comprise the following steps: (a') continuously winding a magnetic alloy wire made of a magnetic alloy around a core such as a mandrel, the magnetic alloy wire having a Curie temperature equal to or higher than the first and second fusion temperatures, the magnetic alloy wire including a first portion where the winding density is relatively high and a second portion where it is relatively low; (b') obtaining a pipe-shaped molded body by extruding the above described second synthetic resin material along with the magnetic alloy wire wound; and (d') cutting the pipe-shaped molded body in a predetermined point in the axial direction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a cross sectional view illustrating an electro-fusion fitting according to one embodiment of the present invention;

FIG. 2 is an illustrative view showing a state where pipes are joined using the embodiment shown in FIG. 1;

FIG. 6 is a perspective view showing a further modified example of the shield member used in the embodiment shown in FIG. 1;

FIG. 7 is an illustrative view showing a joining method using the electro-fusion fitting according the present invention;

FIG. 12 is a perspective view showing a blade working machine used in the embodiment shown in FIG. 10;

BEST MODE FOR CARRYING OUT THE INVENTION

Figure 3:
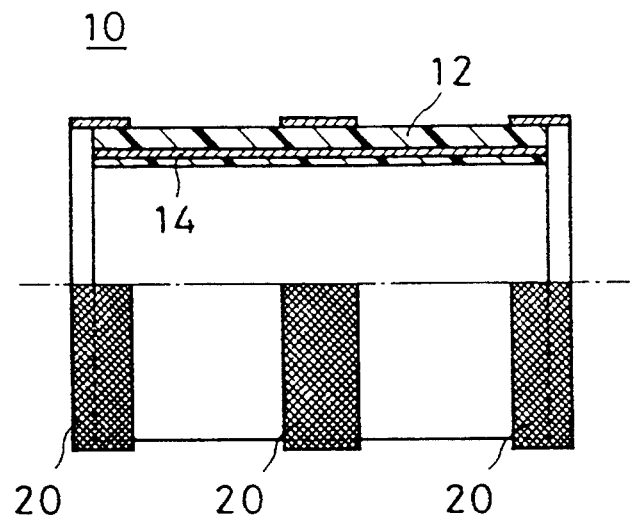
FIG. 3 is an illustrative view showing a modified example of a shield member used in the embodiment shown in FIG. 1.

An electro-fusion fitting 10 in an embodiment shown in FIG. 1 includes a hollow cylindrical body 12 made of synthetic resin. A cylindrical magnetic alloy member 14 which is continuous in the axial direction from one end to the other end of the body 12 is formed on the inner surface of the body 12 (or the vicinity thereof). The magnetic alloy member 14 has a predetermined Curie temperature, and the Curie temperature can be suitably adjusted by changing the mixture ratio of ingredients of the magnetic alloy and is set to the most suitable temperature for fusing and joining pipes 18a and 18b as described later (see FIG. 2). In addition, ring-shaped shield members 16 made of, for example, copper are arranged on the respective outer surfaces of both ends and the center of the body 12, and are fixed to the body 12 with, for example, adhesives.

Meanwhile, the magnetic alloy member 14 may be, for example, a magnetic alloy layer which is formed on the inner surface of the body 12 or the vicinity thereof and has magnetic alloy powder mixed therewith. In addition, the shield members 16 may be replaced with, for example, mesh-shaped shield members 20 as shown in FIG. 3.

Referring to FIG. 2, at the time of joining, pipes 18a and 18b are inserted into the electro-fusion fitting 10 such that their end faces are abutted on each other in a substantially central part of the electro-fusion fitting 10. In this state, both the pipes and the electro-fusion fitting are fixedly held by a suitable clamper (not shown). The high frequency power supply 24 having an induction coil 22 formed therein is arranged in the periphery of the electro-fusion fitting 10. If current is applied to the magnetic alloy member 14 in the electro-fusion fitting 10 from the induction coil 22 in the high frequency power supply 24 by electromagnetic induction, the magnetic alloy member 14 generates heat, so that the inner surface of the body 12 and the outer surfaces of the pipes 18a and 18b are fused and joined to each other. At this time, the respective shield members 16 shield the electromagnetic induction. Accordingly, no induced current is generated in portions, which are covered with the shield members 16, of the magnetic alloy member 14. Consequently, the magnetic alloy member 14 does not generate heat in those portions. Cold zones are formed in both ends and the center, to which the shield members 16 are attached, of the body 12. In the cold zones, the body 12 and the pipes 18a and 18b are not fused. Consequently, joint defects caused by the fact that molten resin flows out of a gap between the body 12 and the pipe 18a or 18b are effectively prevented.

According to the present embodiment, the cold zones can be formed at the time of fusion irrespective of the fact that the magnetic alloy member 14 is continuously formed in the axial direction in the body 12, thereby to make it possible to form the body 12 and the magnetic alloy member 14 by extrusion molding.

Figure 4:
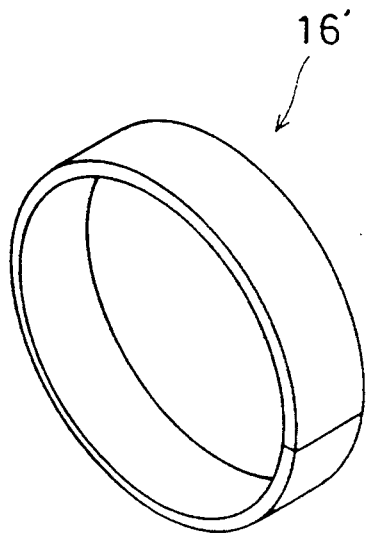
FIG. 4 is a perspective view showing another modified example of the shield member used in the embodiment shown in FIG. 1.
Figure 5:
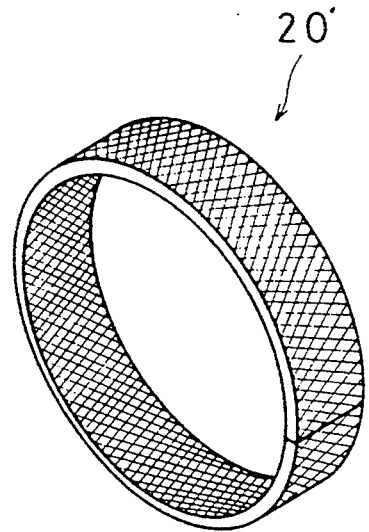
FIG. 5 is a perspective view showing still another modified example of the shield member used in the embodiment shown in FIG. 1.

Meanwhile, in the above described embodiment, the shield member 16 (see FIG. 1) or 20 (see FIG. 3) is fixedly mounted on the outer surface of the body 12. If a C ring-shaped shield member 16' or 20' is used as shown in FIG. 4 or 5, however, the shield member 16' or 20' can be detachably mounted on the outer surface of the body 12. If the shield member 16' or 20' which can be thus detachably mounted is used, it is possible not only to suitably change the position where a cold zone is formed but also to further reduce the manufacturing costs because the shield member can be detached after fusion and used again.

Furthermore, if a plurality of shield members 16' (or 20') are connected to each other through a connecting portion 28 as in a shield member 26 shown in FIG. 6, the plurality of shield members 16' (or 20) can be simultaneously positioned on the outer surface of the body 12.

An electro-fusion fitting 30 used in another embodiment shown in FIG. 7 includes a body 12, similarly to the electro-fusion fitting 10 in the embodiment previously described, and a magnetic alloy member 14 is continuously formed in the axial direction from one end to the other end of the body 12 in the vicinity of the inner surface of the body 12. At the time of joining, pipes 18a and 18b are inserted into the electro-fusion fitting 30. The high frequency power supply 34 is arranged on the outer surface of the electro-fusion fitting 30 in a state where both the pipes and the electro-fusion fitting are fixedly held. The high frequency power supply 34 includes an induction coil 32 so folded as to cover a portion other than a portion where a cold zone is to be formed. If current is applied to the magnetic alloy member 14 in the electro-fusion fitting 30 by electromagnetic induction by the induction coil 32 in the high frequency power supply 34, the magnetic alloy member 14 generates heat, so that the inner surface of the body 12 and the outer surfaces of the pipes 18a and 18b are fused and joined to each other. At this time, the magnetic alloy member 14 in a portion where the induction coil 32 is not arranged does not generate heat, so that the portion will be a cold zone.

According to the present embodiment, the shield member 16, 20, 16' or 20' need not be mounted on the body 12, unlike the embodiment previously described, thereby to make it possible to further improve the productivity of the electro-fusion fitting and further reduce the manufacturing costs thereof.

Figure 8:
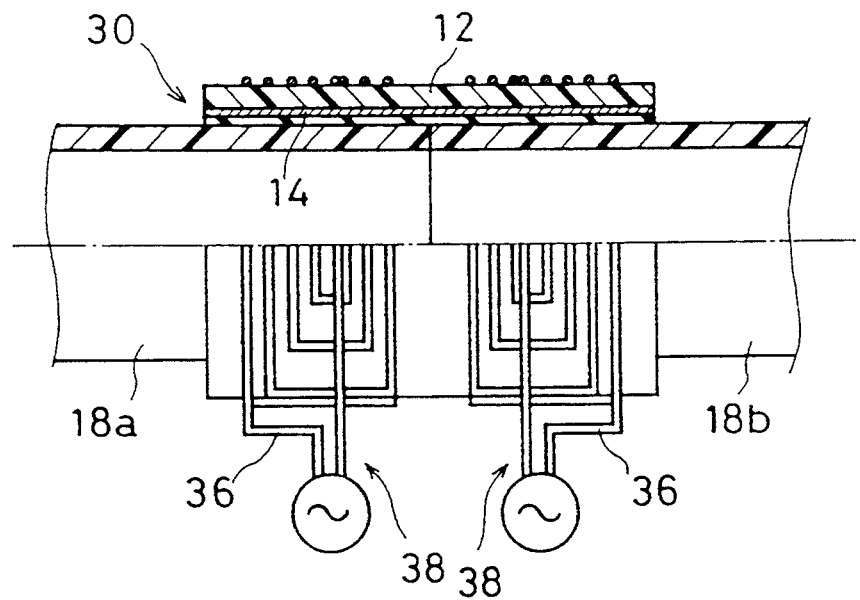
FIG. 8 is an illustrative view showing a modified example of the high frequency power supply used in the embodiment shown in FIG. 7.
Figure 9:
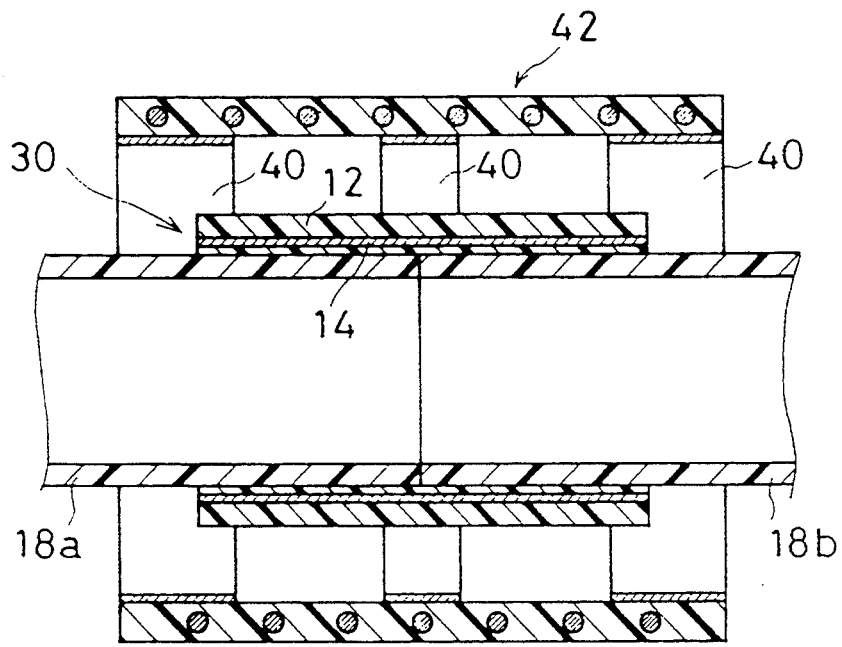
FIG. 9 is an illustrative view showing another modified example of the high frequency power supply used in the embodiment shown in FIG. 7.

Meanwhile, the high frequency power supply 34 shown in FIG. 7 may be replaced with the high frequency power supply 38 having an induction coil 36 spirally formed as shown in FIG. 8. Furthermore, the high frequency power supply 42 having a shield member 40 formed on its inner surface as shown in FIG. 9 may be used. The shield member 40 in the high frequency power supply 42 is for shielding electromagnetic induction from the high frequency power supply, similarly to the above described shield member 16, 20, 16' or 20'. Consequently, at the time of fusing, a portion, which corresponds to the shield member 40, of a heater (magnetic alloy member) 14 does not generate heat, so that a cold zone is formed in a portion, which corresponds to the portion, of the body 12. If the high frequency power supply 42 is used, the position where a cold zone is formed and the size of the cold zone can be simply adjusted by changing the position and the size of the shield member 40.

Figure 10:
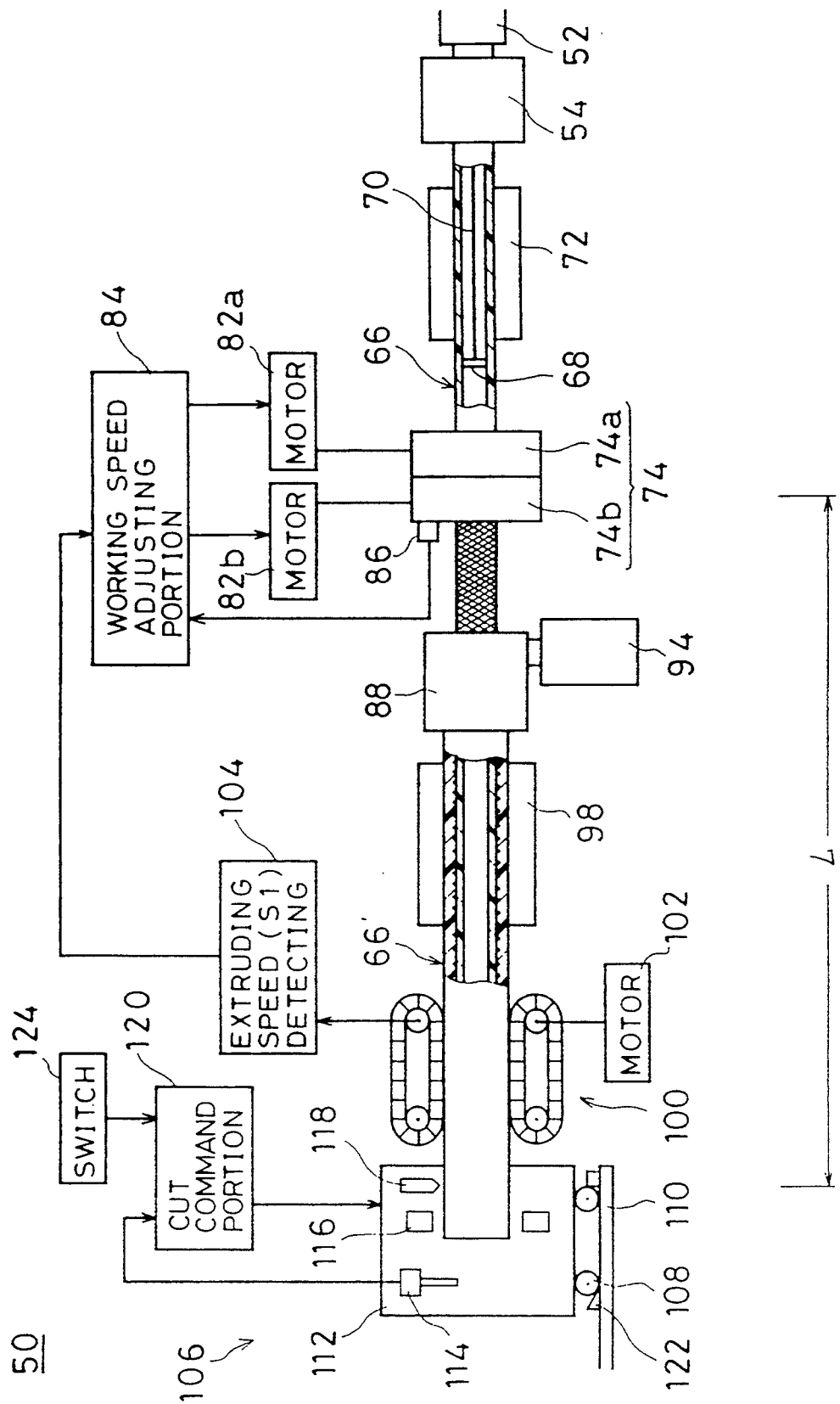
FIG. 10 is an illustrative view showing a method of manufacturing the electro-fusion fitting according to the present invention.
Figure 11:
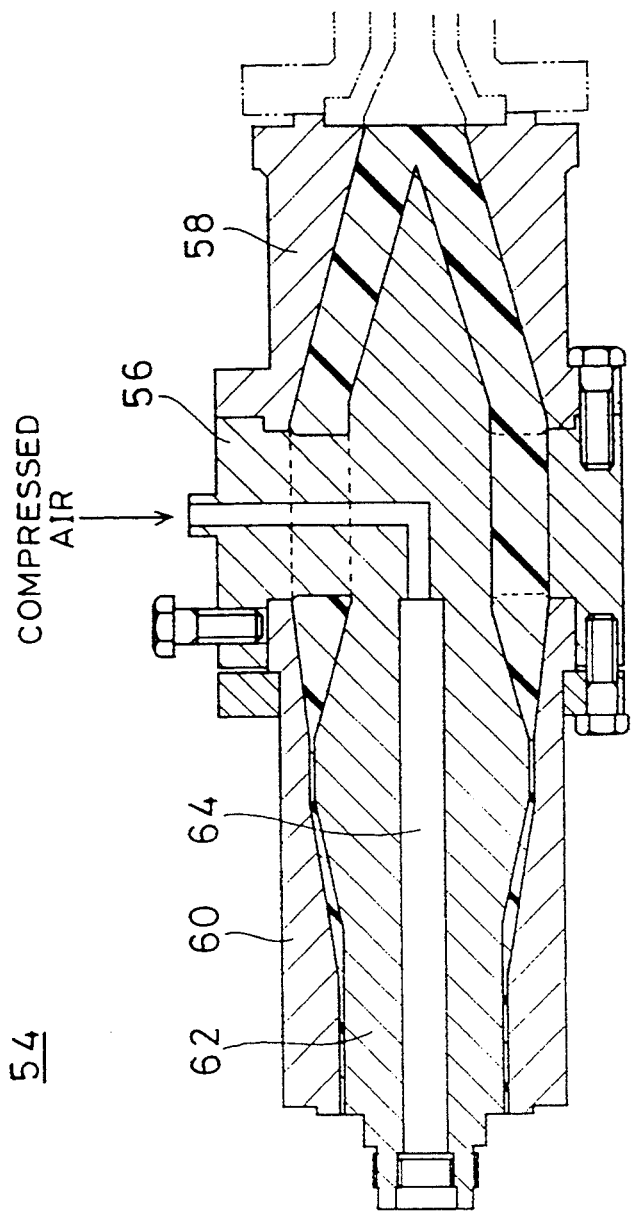
FIG. 11 is an illustrative view showing a first mold used in the embodiment shown in FIG. 10.

A manufacturing apparatus 50 shown in FIG. 10 includes a first extruder 52. A synthetic resin material such as polyethylene which is extruded from the first extruder 52 is applied to a first mold 54. The first mold 54 includes a spider 56, as can be well seen from FIG. 11. An inlet piece 58 is connected to the rear of the spider 56, and a die 60 is connected to the front thereof. A mandrel 62 formed integrally with the spider 56 is arranged inside of the die 60. An air path 64 for blowing off compressed air into a pipe 66 extruded (see FIG. 10) is formed inside of the spider 56 and the mandrel 62. A connecting cord 70 extending from a packing 68 (see FIG. 10) in the pipe 66 is connected to the forward end of the air path 64, that is, the forward end of the mandrel 62 through a connecting member (not shown).

The pipe 66 extruded from the first mold 54 is cooled in a cooling bath 72 and then, is applied to a blade working machine 74. The blade working machine 74 includes a first winder 74a and a second winder 74b, as can be well seen from FIG. 12. The first winder 74a includes a doughnut-shaped body 76a, and a bobbin 80a is rotatably mounted on one major surface of the body 76a, and a magnetic alloy wire 78 made of a magnetic alloy having a predetermined Curie temperature is wound around the bobbin 80a. The second winder 74b is formed similarly to the first winder 74a. Accordingly, the same or similar reference numerals are assigned to the same or similar portions and hence, the duplicate description is omitted.

The first winder 74a is rotated in the direction indicated by an arrow e, so that the magnetic alloy wire 78 wound around the bobbin 80a is wound around the outer surface of the pipe 66. In addition, the second winder 74b is rotated at the same speed as the first winder 74a in tile direction indicated by an arrow f which is opposite to the first winder 74a, and the magnetic alloy wire 78 wound around a bobbin 80b is wound around the outer surface of the pipe 66. The pipe 66 is extruded in the direction indicated by an arrow g at a constant speed, so that the magnetic alloy wire 78 is wound in a mesh shape around the outer surface of the pipe 66, as shown in FIG. 10 or 12.

Meanwhile, the first winder 74a and the second winder 74b are respectively driven by motors 82a and 82b, as shown in FIG. 10, and the rotational speeds of the motors 82a and 82b are controlled by a blade working speed adjusting portion 84. In addition, a photosensor 86 is provided on either one of time first winder 74a and the second winder 74b (the second winder 74b in the present embodiment), thereby to sense the numbers of turns of the magnetic alloy wire 78 by the first winder 74a and the second winder 74. "SPIRALLING MACHINE" manufactured by Kokubu Tekko Co., Ltd., for example, is applicable to such a blade working machine.

Figure 13:
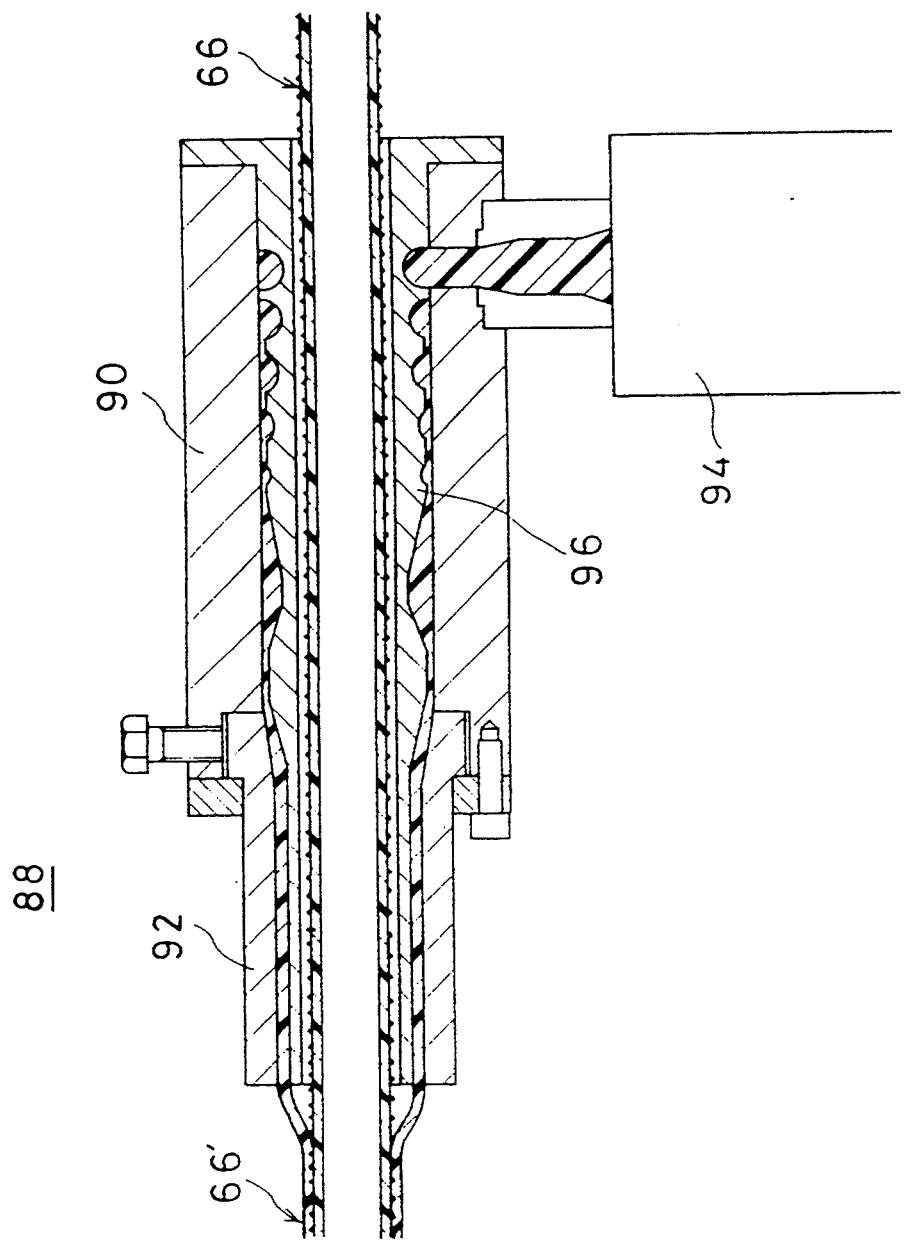
FIG. 13 is an illustrative view showing a second mold used in tile embodiment shown in FIG. 10.

The pipe 66 having the magnetic alloy wire 78 wound in a mesh shape around its outer surface is applied to a second mold 88. The second mold 88 includes a body 90, as can be well seen from FIG. 13. A die 92 is connected to the front of the body 90, and a second extruder 94 is connected to the side thereof. In addition, a spiral mandrel 96 is arranged inside of the body 90 and the die 92. A pipe 66 from the blade working machine 74 is inserted into the spiral mandrel 96. A synthetic resin material extruded from the second extruder 94 is brought into laminar flow and quantified by the spiral mandrel 96 and then, the outer surface of the pipe 66 is coated with the synthetic resin material, to form a pipe-shaped molded body 66'.

The pipe-shaped molded body 66' is cooled in a cooling bath 98 and then, is applied to a take-off machine 100. The take-off machine 100 is for taking off the pipe-shaped molded body 66' at a constant speed, and is driven by a motor 102. In addition, a rotary encoder (not shown) is provided inside of the take-off machine 100, so that a pulse signal from the rotary encoder is applied to an extruding speed detecting portion 104. The extruding speed detecting portion 104 operates an extruding speed $S_1$ on the basis of the pulse signal inputted.

Figure 14:
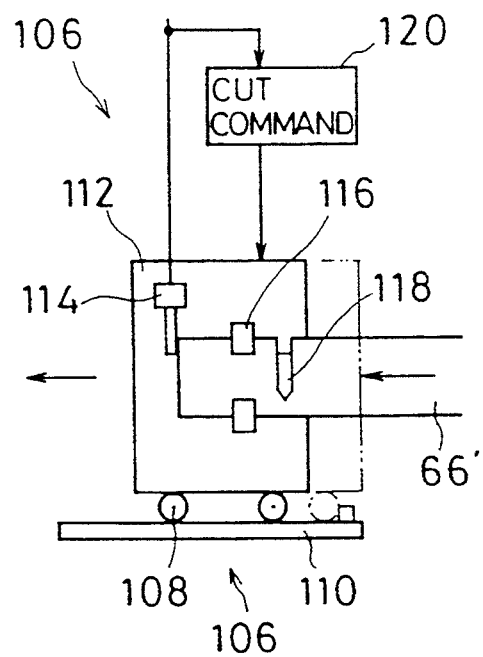
FIG. 14 is an illustrative view showing a state where a pipe-shaped molded body is cut in the embodiment shown in FIG. 10.

The pipe-shaped molded body 66' taken off by the take-off machine 100 is applied to a cutter 106. The cutter 106 includes a body 112 linearly moved on a rail 110 by a wheel 108, and the body 112 is provided with a limit switch (which may be a photosensor or the like) 114, a chuck 116, a cutter 118 and so on. The spacing between the limit switch 114 and the cutter 118 is made equal to the length m of an electro-fusion fitting 126 to be manufactured (see FIG. 15). When the forward end of the pipe-shaped molded body 66' operates the limit switch 114, a cutting signal is applied to a cutting command portion 120 from the limit switch 114. The cutting command portion 120 operates, for example, an air cylinder in response to the cutting signal inputted to close the chuck 116, thereby to fix the pipe-shaped molded body 66' and the body 112 to each other. At the same time, a stopper 112 for engaging the wheel 108 provided on the rail 110 is released. The cutting command portion 120 operates the cutter 118. At the time of cutting the pipe-shaped molded body 66', the body 112 is moved on the rail 110 at the same speed as the extruding speed of the pipe-shaped molded body 66', as can be well seen from FIG. 14. When the cutting of the pipe-shaped molded body 66' is terminated, the chuck 116 is opened, so that the cutter 106 is returned to the home position on the rail 110 and is positioned by the stopper 122. In the state, the cutter 106 waits until the limit switch 114 is subsequently operated. In such a manner, the pipe-shaped molded body 66' is cut to constant lengths. The cutter 106 can be also controlled by a manual operation using a switch 124.

Figure 15:
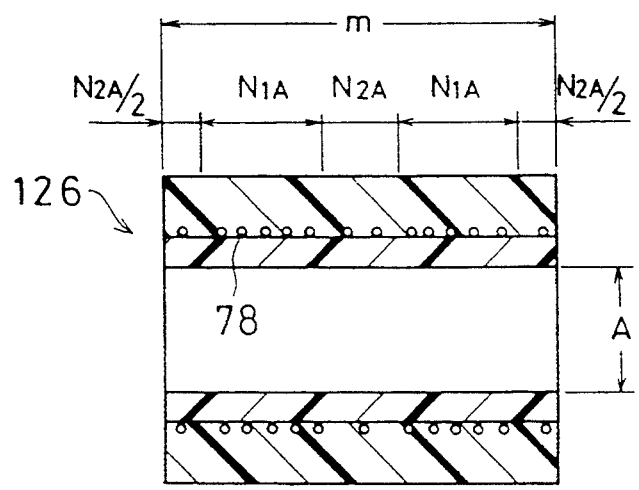
FIG. 15 is an illustrative view showing an electro-fusion fitting manufactured in the embodiment shown in FIG. 10.

By the manufacturing apparatus 50, it is possible to manufacture an electro-fusion fitting 126 which includes a magnetic alloy wire 78 having a first portion where the winding density is high and a second portion where it is low, as shown in, for example, FIG. 15. In order to form the above described first portion and second portion, the winding speed of the blade working machine 74 (the rotational speeds of the motors 82a and 82b) is controlled.

The blade working speed adjusting portion 84 includes a microcomputer (not shown), and tables as shown in Table 1 are stored in its memory. When the bore of the electro-fusion fitting 126 to be manufactured (see FIG. 15) is, for example, A, the microcomputer operates a winding speed $S_2$ in the first portion by an equation "$S_2 = \alpha_A S_1$", and operates a winding speed $S_3$ in the second portion by an equation "$S_3 = \alpha_A S_1$". The motors 82a and 82b are so controlled that the magnetic alloy wire 78 is wound $N_{1A}$ times at the winding speed $S_2$ to form the first portion and is wound $N_{2A}$ times at the winding speed $S_3$ to form the second portion. The number of turns is given by the photosensor 86 provided for the second winder 74b, and the extruding speed $S_1$ is given by the extruding speed detecting portion 104.

TABLE 1

| bore | turns in dense portion | turns in less dense portion | α | β |
|---|---|---|---|---|
| A | $N_{1A}$ | $N_{2A}$ | $\alpha_A$ | $\beta_A$ |
| B | $N_{1B}$ | $N_{2B}$ | $\alpha_B$ | $\beta_B$ |
| C | $N_{1C}$ | $N_{2C}$ | $\alpha_C$ | $\beta_C$ |
| ⋮ | ⋮ | ⋮ | ⋮ | ⋮ |
| Z | $N_{1Z}$ | $N_{2Z}$ | $\alpha_Z$ | $\beta_Z$ |

Figure 16:
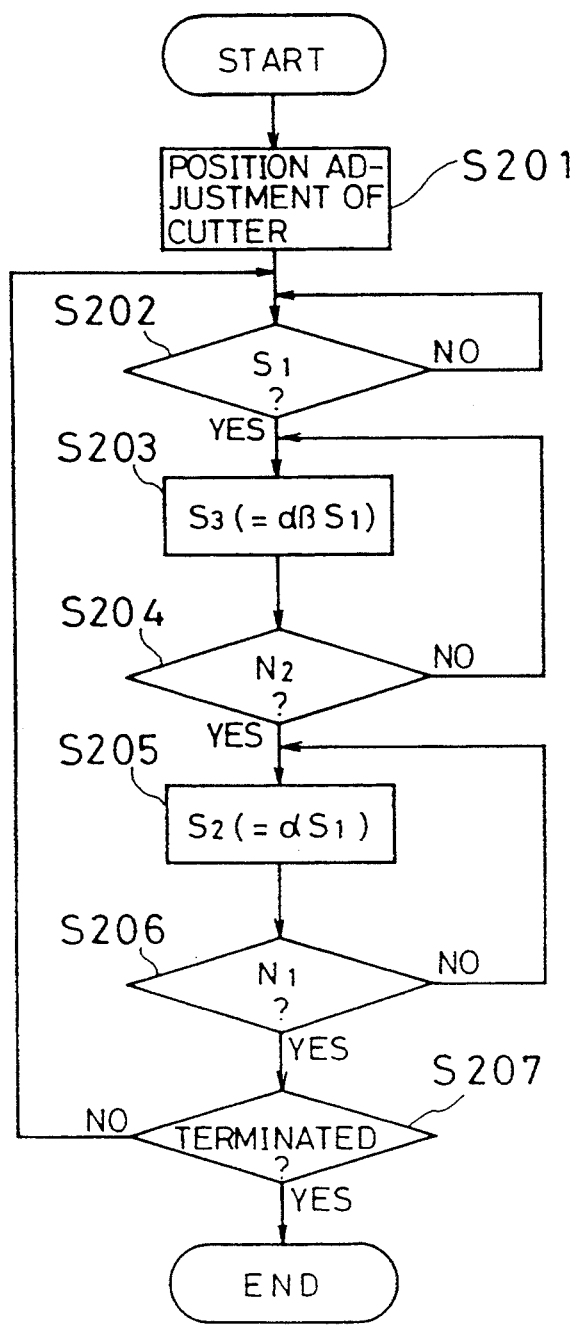
FIG. 16 is a flow chart showing operations in the embodiment shown in FIG. 10.
Figure 17:
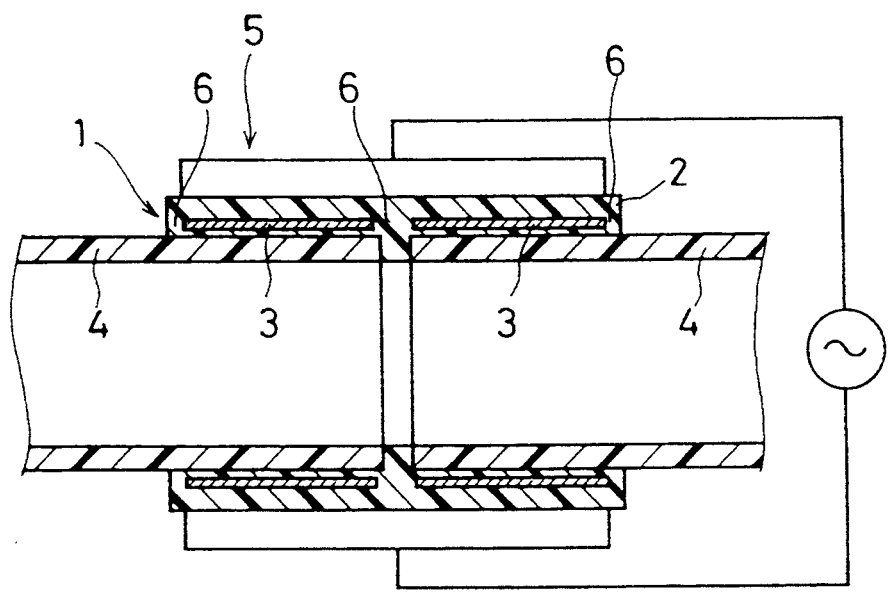
FIG. 17 is an illustrative view showing the prior art.

A method of manufacturing the electro-fusion fitting 126 (see FIG. 15) by the manufacturing apparatus 50 shown in FIG. 10 will be described in more detail on the basis of a flow chart of FIG. 16.

First, in the step S201, the position of the cutter 106 is so adjusted that the distance L (see FIG. 10) from a winding point by the blade working machine 74 to a cutting point by the cutter 118 is integral multiples of the length of the electro-fusion fitting 126 (see FIG. 15), and the table (Table 1) corresponding to the bore A of the electro-fusion fitting 126 to be manufactured is called from the memory. The pipe-shaped molded body 66' is extruded in a state where the blade working machine 74 is stopped.

When the pipe-shaped molded body 66' reaches the take-off machine 100, it is judged in the step S202 whether or not the pipe-shaped molded body 66' is extruded at a constant extruding speed $S_1$. If the answer is in the affirmative, the winding speed $S_3$ in the second portion is operated in the step S203, so that a winding operation in the second portion is started in the blade working machine 74. On the other hand, if the answer is in the negative, the blade working machine 74 waits until the extruding speed $S_1$ becomes constant. It is judged in the step S204 whether or not the number of turns in the second portion is $N_{2A}$. If the answer is in the affirmative, the winding speed $S_2$ in the first portion is operated in the step S205 to change the winding speed from $S_3$ to $S_2$, so that a winding operation in the first portion is started. On the other hand, if the answer is in the negative, the program is returned to the step S203, so that the winding operation in the second portion is continued until the magnetic alloy wire 78 is wound $N_{2A}$ times at the winding speed $S_3$.

It is judged in the step S206 whether or not the number of turns in the first portion reaches $N_{1A}$. If the answer is in the affirmative, the program proceeds to the step S207. On the other hand, if the answer is in the negative, the program is returned to the step S205, so that the winding operation in the first portion is continued until the magnetic alloy wire 78 is wound $N_{1A}$ times at the winding speed $S_2$. It is judged in the step S207 whether or not the winding operation is terminated. If the answer is in the affirmative, the program is terminated. On the other hand, if the answer is in the negative, the program is returned to the step S202, so that the winding operations in the second portion and the first portion are repeated.

As shown in FIG. 15, the second portion where the magnetic alloy wire 78 is wound $N_{2A}/2$ times is positioned in an end of the electro-fusion fitting 126. Accordingly, the cutter 106 is so manually operated that the pipe-shaped molded body 66' can be cut in the middle of the second portion at the time of the first cutting.

According to the present embodiment shown, it is possible to simply manufacture an electro-fusion fitting having a cold zone by only changing the winding density of the magnetic alloy wire 78 in a constant cycle.

Although in the embodiment shown in FIG. 10, two molds, that is, the first mold 54 and the second mold 88 are used so as to form the pipe-shaped molded body 66', only the second mold 88 may be substantially used excluding the first mold 54. In this case, the magnetic alloy wire 78 is wound around a mandrel (not shown) substituted for the pipe 66 so as to include the first portion and the second portion in the same method by the first and second winders 74a and 74b, thereby to obtain a magnetic alloy mesh. The magnetic alloy mesh (not shown) is sent to the second mold 88. A resin layer is formed outside of this mesh-shaped body by the second mold 88. According to this method, an electro-fusion fitting having the magnetic alloy wire 78 shown in FIG. 15 exposed to its inner surface is obtained.

Furthermore, when an electro-fusion fitting in which no resin layer is formed outside of the magnetic alloy wire 78 is manufactured, only the first mold 54 is required and the second mold 88 is not required.

If either one of the second mold 88 and the first mold 54 is thus used, the pipe-shaped molded body 66' can be formed more simply, thereby to make it possible to further reduce the manufacturing costs of the electro-fusion fitting.

Although the present invention has been described and illustrated in detail, it is clearly understood that the same is by way of illustration and example only and is not to be taken by way of limitation, the spirit and scope of the present invention being limited only by the terms of the appended claims.

What is claimed:

1. A method of joining an electro-fusion fitting and a member to be joined made of a first synthetic resin material and having a first joint surface to each other, comprising the steps of:
   (a) preparing an electro-fusion fitting including a body made of a second synthetic resin material and having a second joint surface along said first joint surface of said member to be joined and a magnetic alloy member so formed as to be continuous in an axial direction generally on said second joint surface of said body, said first and second synthetic resin materials respectively having first and second fusion temperatures, said magnetic alloy member having a Curie temperature equal to or higher than said first and second fusion temperatures and below temperatures that would damage the resin materials;
   (b) fixing said member to be joined and said electro-fusion fitting to each other in a state where said first joint surface and said second joint surface are in contact with each other; and
   (c) applying high frequency current to said magnetic alloy member in a region where a joint is to be formed, and
   (d) preventing electromagnetic radiation from linking a region of at least one of the member and the fitting to produce a cold zone between the regions where fusion occurs.

2. The joining method according to claim 1, wherein said step (d) includes a step of arranging a shield member so as to prevent said high frequency current from being applied to said portion where a cold zone is to be formed.

3. The joining method according to any one of claims 1 to 2, wherein in said step (a), said second synthetic resin material has a fusion temperature substantially the same as said first fusion temperature is used.

4. The joining method according to any one of claims 1 to 2, wherein in said step (a), said second synthetic resin material which is substantially the same as said first synthetic resin material is used.

5. A method of manufacturing an electro-fusion fitting to which a member to be joined made of a first synthetic resin material having a first fusion temperature and having a first joint surface is joined using a second synthetic resin material having a second fusion temperature, comprising the steps of:
   (a) winding a magnetic alloy wire around a core, said magnetic alloy wire having a Curie temperature equal to or higher than said first and second fusion temperatures, said magnetic alloy wire including a first portion where it is wound densely and a second portion where it is wound less densely;
   (b) obtaining a longitudinal pipe-shaped molded body by extruding said second synthetic resin material along with said magnetic alloy wire; and
   (c) cutting said pipe-shaped molded body in a predetermined point in an axial direction.

6. The manufacturing method according to claim 5, wherein said step (a) includes the steps of:
   (a-1) continuously forming a pipe by extrusion molding using said second synthetic resin material, said pipe having a second joint surface along said first joint surface of said member to be joined, said first and second synthetic resin materials respectively having first and second fusion temperatures; and (a-2) winding said magnetic alloy wire around the outer surface of said pipe.

7. The manufacturing method according to claim 5 or 6, wherein in said step (b), said second synthetic resin material having substantially the same fusion temperature as said first fusion temperature is used.

8. The manufacturing method according to claim 5 or 6, wherein in said step (b), said second synthetic resin material which is substantially the same as said first synthetic resin material is used.

* * * * *